United States Patent [19]

Ames et al.

[11] 4,084,128
[45] Apr. 11, 1978

[54] DEMODULATOR FOR PHASE REVERSAL MODULATION SYSTEM

[75] Inventors: Stephen A. Ames; Robert J. Martel, both of Baltimore, Md.

[73] Assignee: Westinghouse Electric Corporation, Pittsburgh, Pa.

[21] Appl. No.: 532,640

[22] Filed: Mar. 8, 1966

[51] Int. Cl.² ............................................... H03K 3/00
[52] U.S. Cl. .................................. 329/116; 329/122; 331/6; 331/9
[58] Field of Search ................... 325/320, 24, 163, 30, 325/161, 344, 345, 349, 369, 387; 333/24.1; 329/122, 123, 135, 136, 116; 331/6, 7, 9

[56] References Cited
PUBLICATIONS

Proakis et al., "Performance of Coherent Detection Systems Using Decision-Directed Channel Measurements", 3/64, vol. 47, pp. 54-55, IEEE Transactions on Communications Systems.

Costas, "Some Notes on Space Communications", 8/59, pp. 1383-1385, vol. 47, proceedings of IRE.

Primary Examiner—Nelson Moskowitz
Attorney, Agent, or Firm—R. M. Trepp

[57] ABSTRACT

An improved receiver for use in a PSK signal translation system is described incorporating a voltage tunable local oscillator for continuously generating a reference frequency signal from which the suppressed carrier can be reconstructed, input signal means for an incoming PSK signal, means for adding the reference frequency signal to produce a synthesized carrier which is amplitude modulated by said incoming PSK signal, diode switch means for demodulating synthesized PSK amplitude modulated carrier for causing synchronous phase shifts of the PSK signal components of modulated synthetic carrier in response to the demodulated signals to thereby provide a continuous unmodulated signal synthesizing the suppressed carrier of the incoming PSK signals.

7 Claims, 8 Drawing Figures

DEMODULATOR FOR PHASE REVERSAL MODULATION SYSTEM

GOVERNMENT CONTRACT

The invention herein described was made in the course of or under a contract or subcontract thereunder, with the Department of the Air Force.

BACKGROUND OF THE INVENTION

This invention relates to a demodulator system for a signal translation system using a double-sideband suppressed carrier and more particularly to a demodulator for use in a phase shift keyed signal translation system utilizing double-sideband suppressed carrier.

The present invention is illustrated in connection with a phase reversal modulation system which is a special case of the more generic category of phase shift keyed modulation, familiarly known in the art by the acronym PSK which is hereafter used for convenience. The invention should not be interpreted as being limited to phase reversal modulation.

In the coherent demodulation of PSK signals in a suppressed carrier system, the major problem is that of providing a coherent carrier reference at the receiving end of the system. When the digital data source of information to be translated contains equal numbers of ones and zeroes, which is the normal situation, the transmitted signal exhibits a double-sideband suppressed carrier power spectrum. The present invention provides an improved detector system which provides automatic carrier insertion. The system provides coherent detection of the PSK modulated suppressed carrier specifically illustrated in a phase reversal modulated system while automatically reconstructing the suppressed carrier.

An object of the present invention is to provide a novel and improved demodulation system for PSK signals.

Another object is to provide a novel and improved phase shift demodulator.

Other and further objects will be apparent from the following description when taken in connection with the accompanying drawings.

BRIEF DESCRIPTION OF THE DRAWINGS

SUMMARY OF THE INVENTION

In accordance with the present invention, a receiver is provided for use in a PSK signal translation system comprising a voltage tunable local oscillator for continuously generating a reference frequency signal from which the suppressed carrier can be reconstructed, input signal means for an incoming PSK signal, means for adding said reference frequency signal to produce a synthesized carrier which is amplitude modulated by said incoming PSK signal, diode switch means for demodulating synthesized PSK amplitude modulated carrier for causing synchronous phase shifts of the PSK signal components of modulated synthetic carrier in response to the demodulated signals, to thereby provide a continuous unmodulated signal synthesizing the suppressed carrier of the incoming PSK signals; a servo loop, including said oscillator, said signal adding means and said phase shifting means, for locking said oscillator onto said synthesized carrier.

Figure 1:
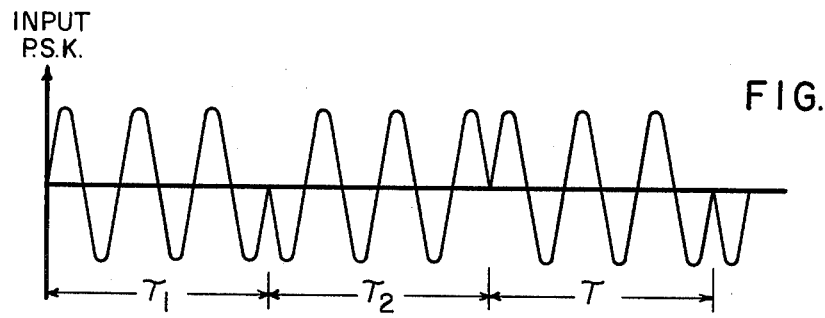
Figure 2:
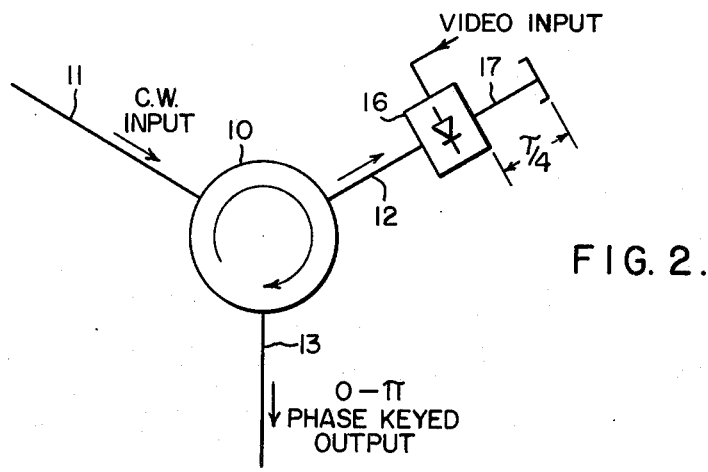
Figure 3:
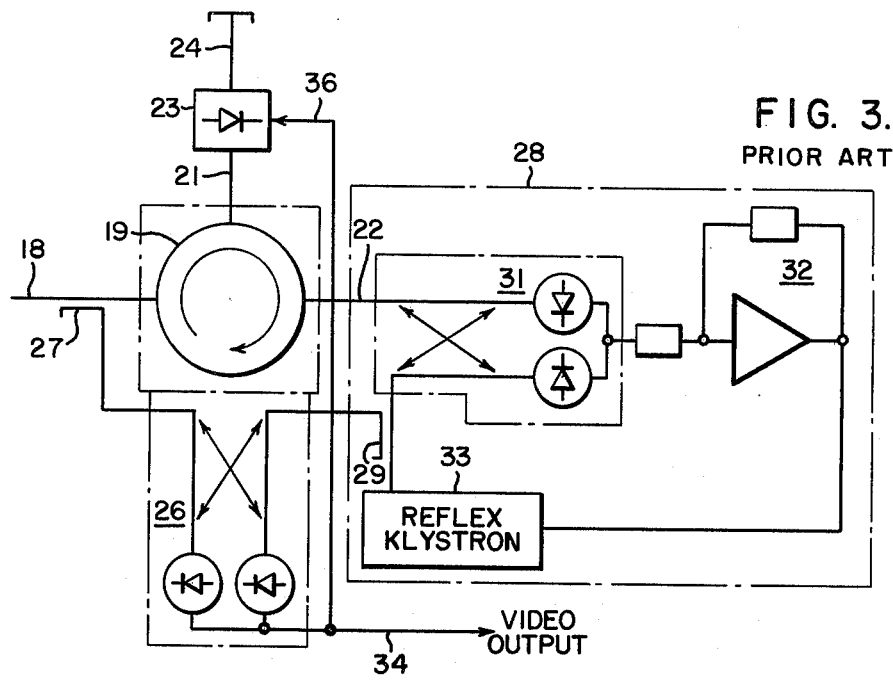
Figure 4:
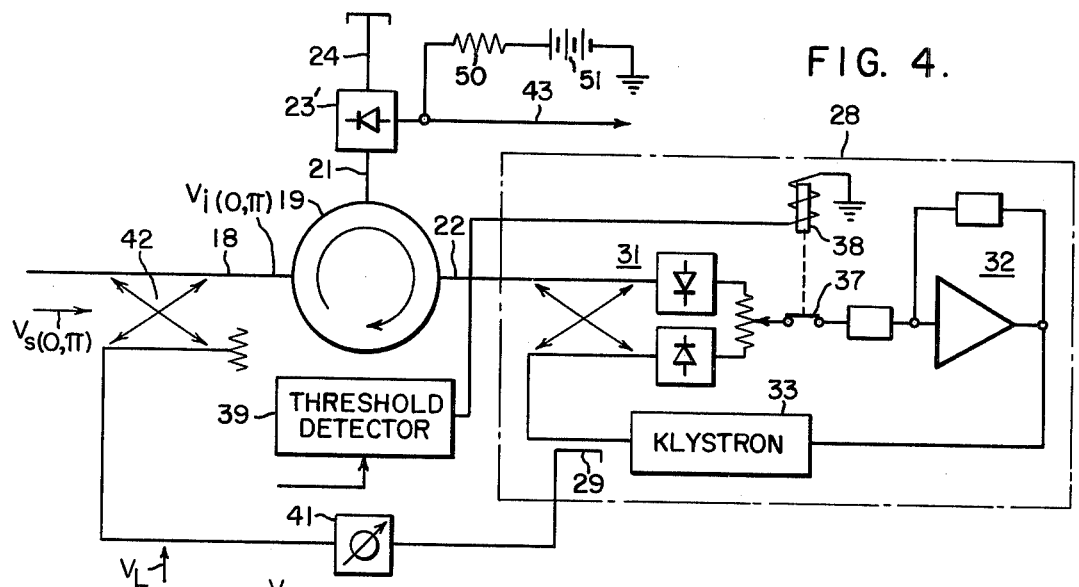
Figure 5:
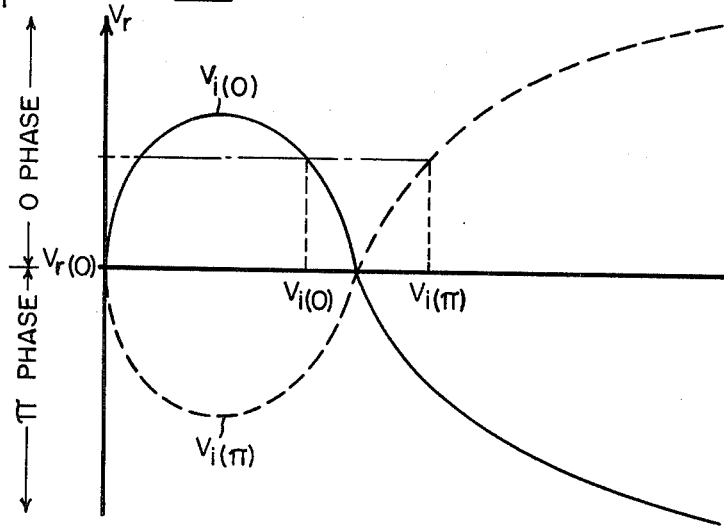
Figure 6:
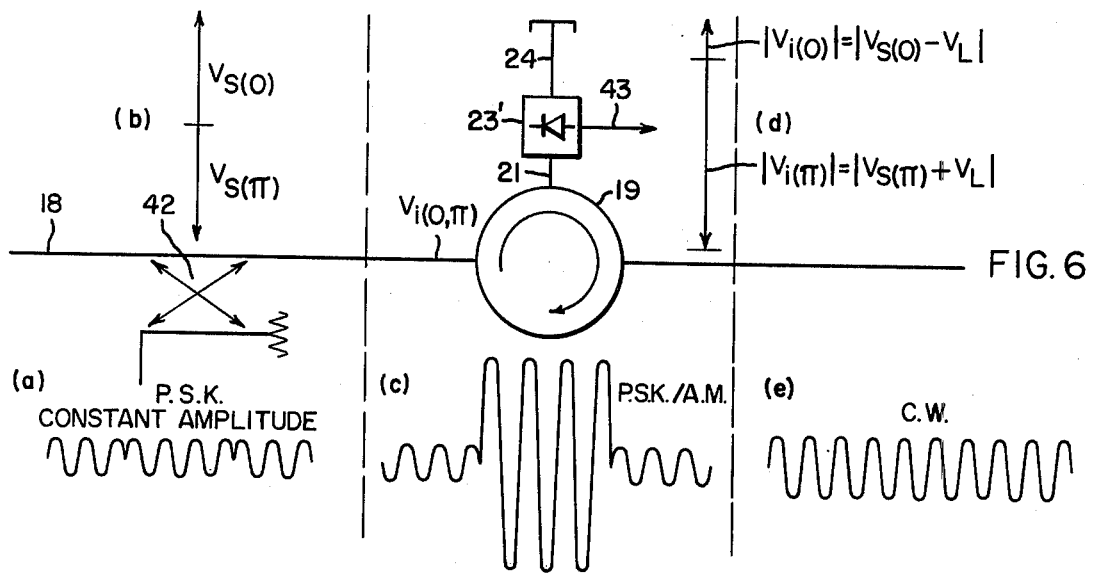
Figure 8:
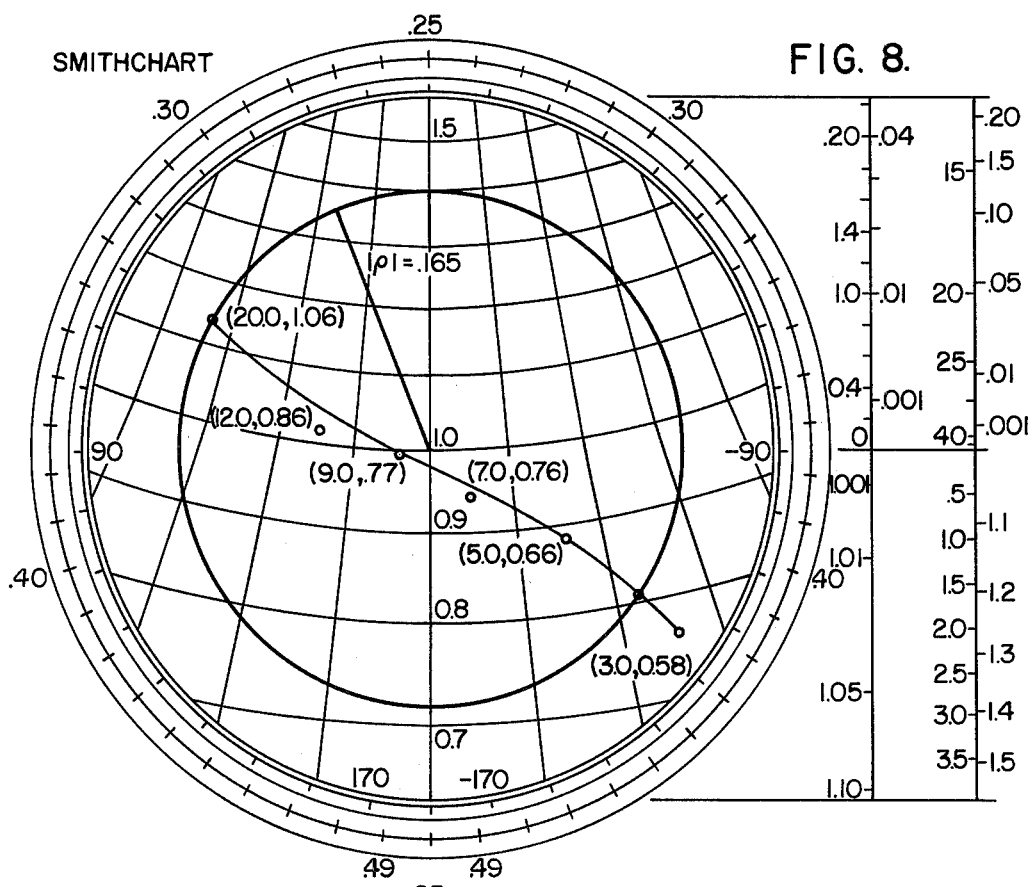
Figure 7:
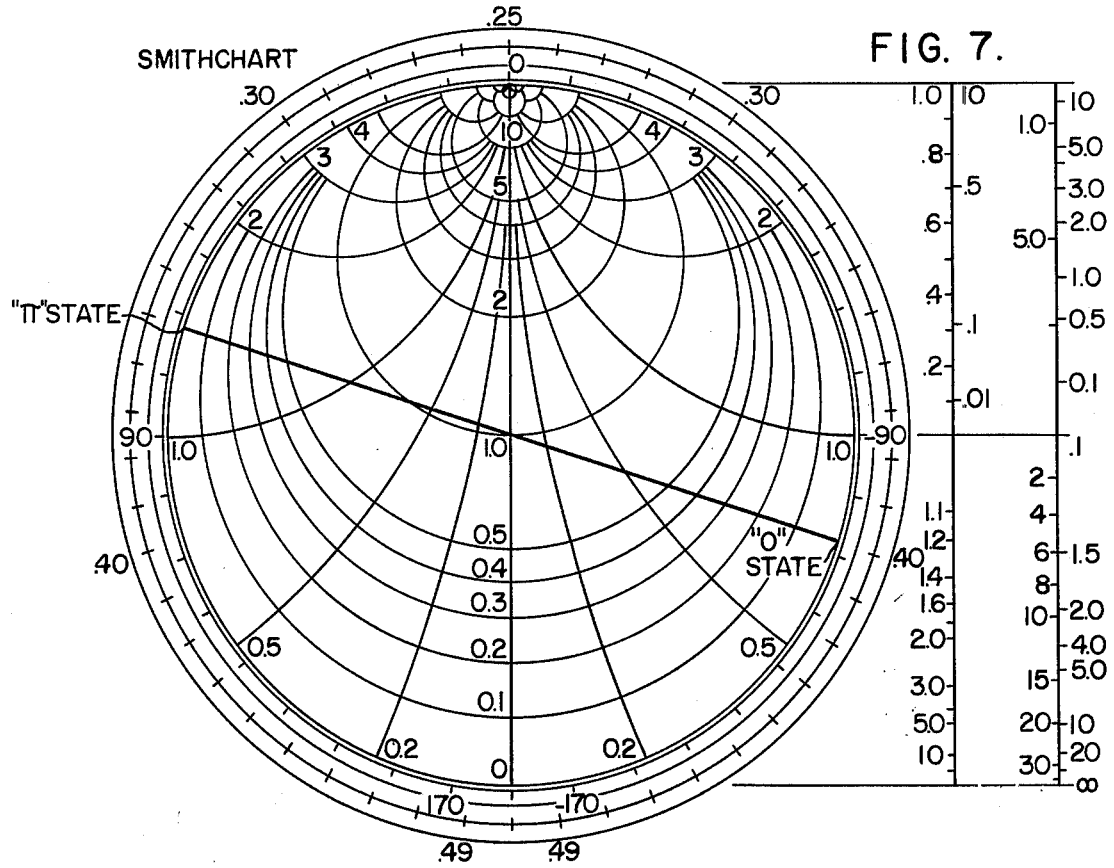

FIG. 1 is a representation of a phase reversal modulated signal—the type to which the illustrated embodiment of the present invention relates;

FIG. 2 is an illustration of a circulator-diode phase shift modulator well known in the prior art;

FIG. 3 is a partial schematic circuit diagram illustrating the prior art;

FIG. 4 is a circuit diagram of the modulator of the present invention;

FIGS. 5 and 6 are graphs helpful in the understanding of the present invention; and FIGS. 7 and 8 are Smith charts including graphs helpful in understanding the invention.

DESCRIPTION OF THE PREFERRED EMBODIMENTS

Since PSK signaling systems are not widely used in a communication system, it is believed helpful to give a brief review of the system in order to facilitate the understanding of the present invention. In FIG. 1 there is illustrated a phase reversal modulation signal. The signal represented is a double-sideband suppressed carrier spectrum which exists when a digital data source contains an equal number of ones and zeros, which is the normal situation. From an inspection of FIG. 1 it will be noted that for successive time intervals indicated as $\tau_1$ and $\tau_2$, respectively, the PSK signal is made up of successive trains of cycles with a phase reversal indicated at the boundary line between the intervals. If we let the signal of a time interval $\tau_1$ represent (0) phase, then the signal of the interval $\tau_2$ will have ($\pi$) phase. Accordingly, in this system the digit ONE may be arbitrarily represented by an (0) phase signal appearing during interval $\tau_1$ and digit ZERO can then be represented by the ($\pi$) phase of the signal occurring during the time interval $\tau_2$. In order to transmit and receive such signals, it is necessary to provide equipment at the transmitting end which will control the phase of the signal in accordance with the digital input ZERO and ONE digits and to provide at the receiving end a demodulator that will detect the phase of the transmitted signal and reconstruct the suppressed carrier to provide a coherent reference.

In FIG. 2 there is shown the basic PSK modulator using switching diodes which can be used at the transmitter of a signal translation system for phase reversal modulation of a carrier signal. This modulator is also the heart of the improved demodulator at the receiving end of the present system. Several techniques of the prior art for controlling the switching diode are not feasible for bit rates on the order of $10^8$ per second and higher. Accordingly, it is the primary objective of this invention to provide an improved demodulator in the form of a self-biasing arrangement whereby the incoming signal is caused to modulate a local oscillator signal serving as the synthetically reconstructed carrier which when rectified directly self-biases a diode switch, hereinafter identified, strictly in synchronism with the phase reversal modulations and thus eliminates one phase detector of the prior art.

Referring to FIG. 2, the circulator 10 is a conventional microwave circulator having arms 11, 12 and 13 through which microwave energy may be propagated to and from the main body of the circulator. The modulator can best be described in terms of its manner of operation. A microwave signal that enters the arm 11 is propagated in the body of the circulator 10 in a clockwise direction. Such a wave will then next arrive at arm 12 which includes a diode switch 16 and a section of microwave guide 17 which constitutes a shorted quarter wavelength stub. If the diode switch 16 is biased to the "OFF" condition, that is, has high impedance to the flow of radio frequency energy, the incident microwave energy is reflected from the diode switch and reenters the main body of the circulator 10 to be propagated to the arm 13 through which it can emerge from the circulator. Let this condition then be called the ZERO (0) phase state. When the diode 16 is based to "ON" condition, that is, has a low impedance to radio frequency, the microwave energy signal entering the arm 12 from the circulator 10 is reflected from the end of the shorted quarter wave stub 17 and is reflected back into the main body of the circulator 10. It will be apparent that under this condition the microwave energy has travelled a distance of 2($\lambda$/4) further than the (0) phase state signal. Thus it is reversed in phase from the (0) phase state. This condition will be referred to as the pi ($\pi$) phase state. It will be seen from the above description that the input microwave energy from the arm 11 emerges from the arm 13 as the (0) or ($\pi$) phase state PSK signal output. Thus, it will be seen that the PSK modulation on the radio frequency carrier emerging from the arm 13 will be determined by the bias voltage on the diode switch 16.

At the transmitter end of the system the carrier is modulated by applying the modulating signals to bias the diode switch. In the demodulator at the receiving end the bias is supplied by the video signal created as a result of the rectified amplitude modulation existing at the input to the circulator 10. This causes the phase shift modulator to reconstruct the suppressed carrier and provide the demodulated output. The novelty of the present invention resides in the manner in which the diode switch is self-biased directly by the modulation of the incoming PSK signal to extract the signal intelligence and also to "unscramble" the phase shifted component of the signal to reconstruct the suppressed carrier.

Under ideal switching conditions, looking into the arm 12 from the circulator 10 the reflection coefficient, P, is seen to remain of constant absolute value, substantially at unity, but at reversed phase when the diode is switched from the (0) to the ($\pi$) phase state. This is shown in the Smith chart of FIG. 7. It is to be noted that for the ideal conditions $jX_o/Z_o = j Z_o/X\pi$. Under such ideal conditions the demodulator has no loss since the diode behaves as a pure reactance.

In prior devices a separate phase detector was necessary to compare the reference oscillator of the phase lock servo loop circuit with the incoming signal and thus demodulate the PSK signal. In those systems the diode switch, corresponding to diode switch 16, was biased by the demodulated data from a separate phase detector to "unflip" the PSK signal in such a way as to restore the suppressed carrier at the output of the demodulator. A prior art system nearest to the present invention is illustrated in the circuit diagram of FIG. 3. A comparison of FIG. 3 and FIG. 4 very succinctly points out the improvement of the present invention over the prior art, represented in FIG. 3.

In FIG. 3 a waveguide section 18 corresponds to the input arm 11 of the circulator 10 shown in FIG. 2, and the circulator 19 of FIG. 3 corresponds to the circulator 10 of FIG. 2. Similarly, waveguide arms 21 and 22 of FIG. 3 correspond, respectively, to the arms 12 and 13 of FIG. 2. A diode switch 23, similar to diode switch 16 of FIG. 2 is connected to arm 21 which is terminated in a shorted quarterwave stub 24. A phase detector 26 is coupled to the input waveguide section 18 to receive some of the incoming PSK signal therefrom by means of a directional coupler 27. The detector 26 is also coupled to a phase locking servo loop 28 through a second directional coupler 29 to receive some of the signal from the servo loop. The phase locking servo loop is of conventional construction and includes a hybrid phase detector 31, an operational amplifier active loop filter 32, and a reflex klystron voltage controlled oscillator 33, herinafter referred to by the acronym VCO. The VCO, controlled by the servo loop, provides a reference frequency which constitutes the reconstructed carrier, which is mixed with the input signal from waveguide section 18 in the phase detector 26 and coherently demodulated to provide the video output signal on conductor 34. This video signal is supplied by conductor 36 to bias the diode switch 23 to the "ON" and "OFF" conditions, respectively, in the manner discussed in connection with FIG. 2. At the same time, the reconstructed continuous wave (CW) carrier output is provided at arm 22 and is inserted into the phase locking loop.

The prior art implementation shown in FIG. 3 is not capable of operating at bit rates much beyond $10^8$ per second and this invention, specifically illustrated in FIG. 4, is directed to a means for eliminating the limitations of the prior devices. This is accomplished by the special manner in which the diode switch 23', in the circuit configuration of FIG. 4 is caused to generate its own self-biasing voltage as a result of the summing of the input signal $V_s$ (0,$\pi$) and the reference signal $V_L$ from the local oscillator.

The reason that the system of the prior art, as illustrated in FIG. 3, is not feasible at bit rates above $10^8$ is due to the necessity of transferring the demodulated video from detector 26 to the diode switch 23 where the PSK to CW conversion of the input must occur. As the length of the data bit approaches one nanosecond, extreme difficulty in the proper transmission of these pulses occurs due to the path delay in transmission line 36 and the loss inevitably occurring, when attempting to drive the diode switch 23 from the detector diodes in 26 because of the low video impedance presented by the diode switch 23. A quick comparison of prior art of FIG. 3 and the present invention in FIG. 4 will illustrate the exact pointed difference between the two systems. The corresponding components of FIGS. 3 and 4 are substantially identical but it should be noted that in FIG. 3 a part of the incoming PSK signal in arm 18 is picked off by the directional coupler 27 and supplied to the phase detector 26 where it is compared with signals from the VCO which are picked off by the directional coupler 29, to develop the demodulated video output on conductor lead 34 and this is supplied to the diode switch 23 over the lead 36. In FIG. 4, on the other hand, the signal from the VCO is fed into the input arm 18 through the directional coupler 42 to produce a PSK amplitude modulated synthetic carrier which is supplied to the circulator 19 and the diode switch 23'.

In FIG. 4 the diode switch 23' serves the dual functions of a rectifier, to demodulate the PSK-AM synthetic carrier and thus produce its own self-bias to cause it to act as a closed switch in the arm 21, to "unflip" the phase shifted component of the signal, with the digital video output being supplied at 43 and the synthetic carrier being returned through arm 22 to the servo loop 28 as the reconstructed suppressed carrier of the incoming PSK signal.

By taking advantage of an interesting property of the modulator configuration in accordance with this invention, the phase modulator can be used with arbitrarily small driving voltage bias levels on the diode switch in FIG. 4. The significance of this can be seen from the graphs of FIGS. 7 and 8.

First, the reason for the novel operation of FIG. 4 will be reviewed, after which FIG. 4 will be discussed in greater detail.

The important feature of this invention is that the trajectory of the reflection coefficient P of the diode switch 23', located between the arm 21 and the quarter-wave stub 24, as a function of bias comes close to being a straight line and passes near the point $1 + jo$ on the Smith chart as shown for a typical diode in FIG. 8. The reflection coefficient P at a discontinuity in a transmission line is defined as:

$$P = V_r/V_i = (Z_L - 1)/(Z_L + 1) \quad (1)$$

where $V_r$ is the reflected voltage at the discontinuity; $V_i$ is the incident voltage; and $Z_L$ is the normalized complex load impedance. Then, if $Z_L$ is changed to $1/Z_L$, the reflection coefficient becomes $-P$, indicating that the reflected wave is $\pi$ radians out of phase with the incident wave. Since the amplitude of the reflected wave is:

$$V_r = V_i |P| \quad (2)$$

changing from a normalized impedance $Z_L$ to $1/Z_L$ is the equivalent of moving one-quarter wavelength on the Smith chart on a circle of radius P. Since the locus of the set of all points $Z_L$, $1 + jo$ and $1/Z_L$ lie on straight lines through the center of the chart and since the diode switches, such as the diode switch 23', exhibit the straight line behavior, it is concluded that the PSK modulation can be achieved with arbitrarily small voltage swings by DC biasing the diode at $1 + jo$ so that very small swings in bias voltage on either side of this point will change the impedance from $Z_L$ to $1/Z_L$. Since this causes the reflection coefficient to change from $+P$ to $-P$, it means that a very small driving signal will change the PSK demodulator from the (0) phase to the ($\pi$) phase condition corresponding to a "ONE" and "ZERO" digit video signal, respectively.

It has been found experimentally that when the radio frequency power level incident upon the diode switch and quarter-wave stub combination is varied, the impedance trajectory traces out a substantially straight line characteristic generally indicated in FIG. 7. In other words, if a CW signal into the input arm 18 is increased from zero the wave energy emerging from arm 22 becomes increasingly attenuated until some critical power level is reached, such as at the point corresponding to $1 + jo$ at the center of the chart, where the output signal becomes zero. If the power is now increased past the critical value, the attenuation falls and the phase of the signal emerging from the arm 22 is 180° out of phase with the signal previously in this arm when the value of the input signal was below the critical value. This is also the action that occurs due to the self bias of the diode switch 23' due to the rectification of the resultant of the input PSK signal $V_s(0,\pi)$ and the VCO reference signal $V_L$ summed in the directional coupler 42 (FIG. 4) in the input arm 18.

Referring further to FIG. 4, the input arm 18, the arm 21, quarter wave stub 24, the diode switch 23' and the arm 22 are identical to the corresponding components of FIG. 3. However, in FIG. 4 the reference signal $V_L$ from the VCO is supplied to the input arm 18 through the directional coupler 42. Also, the phase lock servo loop circuit 28 is the same as in FIG. 3 with the exception that a relay switch 37 is provided between the output of phase detector 31 and the operational amplifier. This switch 37 is controlled by a relay winding 38 energized from a threshold detector 39 to open the phase lock loop upon the loss of received signals to prevent the loop from attempting to self-lock on its own reference VCO.

The pointed distinction between the invention in FIG. 4 and the prior art in FIG. 3 is the elimination of the phase detector 26 and its connection to the diode switch 23'. In FIG. 4 the directional coupler 29 is connected through a phase adjuster 41 and a directional coupler 42 to the input arm 18 to facilitate acquisition when starting the system into operation.

The impedance trajectories applicable to the operation of FIG. 4 can be approximated by the equation $$P = - A \ln I_D + B \quad (3)$$

where $I_D$ is the total diode current; $A$ is a constant for a particular diode; $B$ is a constant for a particular diode; and $\ln$ is the logarithm to the base $e$.

If the diode is a square law detector over the range of input power, the rectifier current can be written as $$i_r = C |V_i|^2 \quad (4)$$

where $i_r$ is the rectified current; $V_i$ is the voltage of the incident wave; and, $C$ is the square law constant. The current $I_D$ (equation 3) is the sum of the rectified current and the d.c. bias current, that is, $$I_D = i_r + i_o \quad (5)$$

where $i_o$ is the d.c. bias current.

Substituting equations (4) into (5) and (5) into (3) gives:

$$P = - A \ln (C |V_i|^2 + i_o) + B \quad (6)$$

Recognizing that by definition $$P = \pm V_r/V_i \quad (7)$$

the reflection coefficient P as written in equation (2) can be positive or negative since $V_i$ can be either (0) or ($\pi$) phase. An expression for $V_r$ can be obtained by substitution between equations (6) and (7) and rearranging to give $$V_r = \pm V_i A \ln (C |V_i|^2 + i_o) + BV_{i_o} \quad (8)$$

As applied to FIG. 4 and the curves of FIG. 5, $V_i$ is the error signal in the phase lock servo loop resulting from the addition, in the directional coupler 42, of the voltage $V_L$ from the VCO and the incoming PSK signal supplied to the outer end of arm 18 as indicated at $V_{S(0,\pi)}$ in FIG. 4. The signal $V_i$ may be considered the signal incident upon the input to the circulator 19 as indicated at $V_{i(0,\pi)}$. It is to be understood that these signals may have 0 or $\pi$ phase as explained above. Accordingly, when used herein $V_i$ (0) indicates the incident error signal voltage at zero phase while $V_i(\pi)$ indicates the same voltage at $\pi$ phase. Also $V_r$ designates the reflected wave voltage from the arm 21 of the circulator with the (0) or (π) phase being indicated where appropriate.

A graphical representation of $V_r$ as a function of $V_i$ is shown in FIG. 5; the solid curve showing $V_r$ for $V_{i(0)}$ and the broken line showing $V_r$ for $V_{i(\pi)}$. The solid curve indicates that $V_r$ and $V_i$ coincide for zero phase; zero phase being measured with respect to the reference signal, $V_L$.

As previously indicated, the present system uses a double sideband suppressed carrier phase reversed modulated wave, and this is represented at (a) in FIG. 6; the vector representation being shown at (b). This is the signal $V_{s(0,\pi)}$ that enters the input arm 18 where it is combined with the coherent reference frequency voltage supplied through the directional coupler 42. The coherent reference frequency voltage is a coherent carrier replica. Assume then that the carrier replica is in phase with one of the phase states of the signal, say $V_{s(\pi)}$. The result of the addition of the carrier replica and the input signal is a phase reversal modulated signal having considerable amplitude modulation as shown at (c) in FIG. 6; the vector representation being shown at (d). The new composite signal $V_{i(0,\pi)}$ emerging from the circulator 19 is shown at (e), and the video modulation is demodulated in the diode switch 23' and appears at the video output 43.

As will be seen from subsequent description the diode switch 23' is directly self-biased by the amplitude modulated PSK resultant signal $V_{i(0,\pi)}$ entering the circulator 19 from the arm 18 so that it "unflips" the (π) phase shifted component which comes out the arm 22 as the reflected signal $V_{r(0)}$, a CW signal that is the reconstructed carrier onto which the VCO locks through the action of the phase lock servo loop. At the same time the rectifying action of the diode switch 23' extracts the video modulation and supplies it to the video output 43.

By way of explanation of the operation the voltage in the zero phase state is $$V_{r(0)} = |V_{s(0)} - V_L| \angle 0 \qquad (9)$$

and the voltage in the phase state is $$V_{r(\pi)} = |V_{s(\pi)} + V_L| \angle \pi \qquad (10)$$

If $V_{i(0)}$ is as shown in FIG. 5, the amplitude and phase of the reflected wave can be determined by drawing a vertical line from the $V_i$ axis to the $V_{i(0)}$ curve, as shown. Likewise, the amplitude and phase of the reflected voltage $V_{r(0)}$ for $V_{i(\pi)}$ can be determined by constructing a vertical from the $V_i$ axis to the $V_{i(\pi)}$ curve. For the case described above, the reflected voltage $V_{r(0)}$ that emerges from arm 22 of the circulator is seen to have a constant amplitude and phase and is the coherent replica of the suppressed carrier. This signal, which will be corrupted by the received noise is tracked by the phase-lock loop. Thus, it will be seen that a coherent replica of the $V_{r(0)}$ signal which is established by the phase-lock loop is fed back into the input arm 18, as previously described, and when combined with the input signal $V_{s(0,\pi)}$ provides the automatic self-biasing action on the diode switch 23'.

The effect of the d.c. bias current $i_o$, through the resistor 50 and battery 51, is to adjust the value at which the $V_r$ curve (FIG. 5) changes phase. By properly adjusting the d.c. bias the $V_r$ curve can be made very steep and thereby further reduce the required driving voltage.

Since the demodulator action depends upon the presence of a coherent carrier, it is necessary at the beginning of the operation to cause the VCO to be coherent with the input signal at arm 18. Accordingly, the initial acquisition can be made on either a modulated or an unmodulated transmitter carrier. Once this is accomplished, the received signal frequency can be memorized or held for reasonably long periods, up to minutes, without the necessity of a reacquisition procedure, provided the transmitter and VCO have not drifted appreciably. The time of allowable signal interruption will depend upon the stability of the VCO, the d.c. stability of the operational amplifier and the quality of the capacitor used in the operational amplifier feedback network. It may be necessary, however, to open the phase lock loop upon the loss of received signal to prevent the loop from attempting to self-lock on its own VCO. The frequency of the self-lock would be dictated by the differential path length between the two paths from the VCO to the phase detector. Opening of the loop upon the loss of received signal is caused by absence of signal from the threshold detector 39 which causes the relay switch 37 to open. Sensing of the absence of this signal can best be accomplished by monitoring of the receiver AGC voltage; however, several other methods could be employed depending upon the particular system in which the demodulator is used.

We claim as our invention:

1. A receiver for use in a PSK signal translation system comprising a voltage tunable local oscillator for continuously generating a reference frequency signal from which the suppressed carrier can be reconstructed, input signal means for an incoming PSK signal, means for adding said reference frequency signal to produce a synthesized carrier which is amplitude modulated by said incoming PSK signal, diode switch means for demodulating synthesized PSK amplitude modulated carrier for causing synchronous phase shifts of the PSK signal components of modulated synthetic carrier in response to the demodulated signals, to thereby provide a continuous unmodulated signal synthesizing the suppressed carrier of the incoming PSK signals; a servo loop, including said oscillator, said signal adding means and said phase shifting means, for locking said oscillator onto said synthesized carrier.

2. The combination as set forth in claim 1 in which said diode switch derives its switching bias voltage directly from the rectification of said PSK-AM synthetic carrier.

3. The combination as set forth in claim 1 in which said phase shifting means includes a microwave circulator; an input arm; a second arm terminated in a quarter wave shorted stub; a rectifier across the junction of said second arm and the open end of said stub and responsive to the PSK amplitude modulated carrier signal for deriving a dynamic bias to synchronously demodulate the PSK modulation and simultaneously demodulate the resulting envelope to provide video output.

4. The combination as set forth in claim 1 in which said phase shifting means is constructed to reverse the phase of the phase shifted components of the incoming signal.

5. The combination as set forth in claim 1 in which said phase shifting means includes a microwave circulator having an input arm and at least two other arms, one of said arms having connected thereto a shorted microwave stub of selected length to be resonant at a selected frequency, a diode switch at the junction of said one arm and said shorted stub responsive to the PSK amplitude modulated synthetic carrier to be synchronously self-biased to serve as a shorted switch across the junction of said arm and stub.

6. The combination as set forth in claim 5 in which said shorted stub is equal in electrical length to one quarter wavelength of operating frequency of the system.

7. The combination as set forth in claim 5 in which said diode switch is provided with means for establishing a selected d.c. bias.

* * * * *